United States Patent
Chang (10) Patent No.: US 10,459,463 B2
(45) Date of Patent: Oct. 29, 2019

(54) WATER FLOW CONTROL VALVE

(71) Applicant: Chia-Po Chang, Changhua (TW)

(72) Inventor: Chia-Po Chang, Changhua (TW)

(73) Assignee: HAIN YO ENTERPRISES CO., LTD., Changhua (TW)

(*) Notice: Subject to any disclaimer, the term of this patent is extended or adjusted under 35 U.S.C. 154(b) by 278 days.

(21) Appl. No.: 15/467,979

(22) Filed: Mar. 23, 2017

(65) Prior Publication Data

US 2018/0275695 A1 Sep. 27, 2018

(51) Int. Cl.
| | |
|---|---|
| *G05D 11/02* | (2006.01) |
| *G05D 11/03* | (2006.01) |
| *G05D 11/16* | (2006.01) |
| *G05D 23/13* | (2006.01) |
| *F16K 11/00* | (2006.01) |
| *F16K 11/078* | (2006.01) |

(52) U.S. Cl.
CPC .......... *G05D 23/1313* (2013.01); *F16K 11/00* (2013.01); *F16K 11/0782* (2013.01); *F16K 11/0787* (2013.01); *G05D 11/02* (2013.01); *G05D 11/03* (2013.01); *G05D 11/16* (2013.01); *G05D 23/1306* (2013.01)

(58) Field of Classification Search
CPC ........ G05D 11/02; G05D 11/03; G05D 11/16; G05D 23/13; G05D 23/1306; G05D 23/1313

USPC ..................................................... 236/12.17
See application file for complete search history.

(56) References Cited

U.S. PATENT DOCUMENTS

| | | | |
|---|---|---|---|
| 5,511,723 A * | 4/1996 | Eki ..................... | G05D 23/1393 137/88 |
| 8,985,147 B2 * | 3/2015 | Chang .................... | F16K 11/18 137/597 |
| 2015/0114484 A1* | 4/2015 | Chang .................... | F16K 11/07 137/100 |

* cited by examiner

Primary Examiner — Edward F Landrum
Assistant Examiner — Daniel C Comings
(74) Attorney, Agent, or Firm — Che-Yang Chen; Law Offices of Scott Warmuth (57) ABSTRACT

A water control valve may comprise a valve shell, a sliding block, an operating valve piece, a fixing valve piece, a valve base and a check valve. The sliding block, the operating valve piece and the fixing valve piece are stacked sequentially and positioned inside the valve shell. The sliding block has a valve rod which is formed at an upper portion thereof and sticking out of the valve shell, and a bottom portion of the sliding block is engaged with the operating valve piece such that, through operating the valve rod, the sliding block is configured to drive and have movements with the operating valve piece concurrently to perform different aligning patterns between the operating valve piece and the fixing valve piece, thereby enabling the water control valve to control on/off operation of a faucet, the amount of water flow and the mixing ratio of hot/cold water.

3 Claims, 7 Drawing Sheets

WATER FLOW CONTROL VALVE

FIELD OF THE INVENTION

The present invention relates to a water control valve, and more particularly to a water control valve configured to enable water to selectively flow out through a lateral portion or a bottom portion thereof.

BACKGROUND OF THE INVENTION

Generally, a faucet is configured to provide both of hot water and cold water, and warm water is provided from mixing hot water and cold water. Thus, a faucet may comprise a water control valve to mix hot and cold water before flowing out, thereby providing different temperatures of water. Furthermore, the water control valve is installed inside the faucet, and the faucet further has a cold water channel, a hot water channel and a water outlet channel formed at a bottom portion thereof. The control valve is configured to control cold water to flow through the cold water channel or hot water to flow through the hot water channel into a compartment of the control valve. Thus, when concurrently flowing into the compartment, cold water and hot water are configured to mix in the compartment, and the cold water, hot water, or mixed water is configure to flow out of the faucet through the water outlet channel.

However, the conventional water control valve is disadvantageous because: the control valve only enables water to flow out from a bottom portion thereof, and the applicability of the control valve is limited when the control valve has different structures of interior channels and needs to flow out of water from a lateral portion thereof. Therefore, there remains a need for a new and improved design for a water control valve to overcome the problems presented above.

SUMMARY OF THE INVENTION

The present invention provides a water control valve which comprises a valve shell, a sliding block, an operating valve piece, a fixing valve piece, a valve base and a check valve. The sliding block configured to position inside the valve shell has a valve rod which is formed at an upper portion thereof and sticking out of the valve shell. Moreover, a bottom portion of the sliding block is engaged with the operating valve piece such that, through operating the valve rod, the sliding block is configured to drive the operating valve piece to have movements concurrently thereby achieving different aligning patterns between the operating valve piece and the fixing valve piece. Thus, the water control valve is configured to control on/off operation of a faucet, the amount of water flow and the mixing ratio of hot/cold water. The valve base is configured to block a bottom portion of the valve shell, thereby preventing the sliding block, the operating valve piece and the fixing valve piece from falling out of the valve shell. Also, the valve base comprises a water inlet chamber, and the check valve is installed therein. The valve shell comprises a housing chamber formed therein, and an upper portion of the valve shell has a diameter smaller than a lower portion thereof, and an upper opening is formed at the upper end of the valve shell. The sliding block, the operating valve piece and the fixing valve piece are configured to be positioned inside the housing chamber of the valve shell in sequence, and the valve rod is configured to stick out of the valve shell through the upper opening. Moreover, the housing chamber comprises at least a water outlet opening penetrating through a lateral wall of the valve shell. The operating valve piece has a mixing hole vertically penetrating through a central portion thereof, and a top surface of the operating valve piece has at least a horizontal water channel which is communicated with the mixing hole. The fixing valve piece has a first water inlet hole and a second water inlet hole, which are formed at corresponding positions and respectively penetrate through a bottom portion of the fixing valve piece. Furthermore, a first water outlet hole vertically penetrating through the fixing valve piece is located between the first water inlet hole and the second water inlet hole. The valve base comprises the water inlet chamber and a water outlet chamber, which are separately formed at an interior space of the valve base. Moreover, a cold water inlet hole and a hot water inlet hole respectively penetrate through a top portion of the valve base to communicate with the water inlet chamber, and a second water outlet hole penetrates through the top portion of the valve base to communicate with the water outlet chamber. The operating valve piece and the fixing valve piece are overlapped and positioned inside the housing chamber, and the valve base is configured to support and engage with the fixing valve piece. Also, the cold water inlet hole, the hot water inlet hole and the second water outlet hole are configured to be respectively aligned with the first water inlet hole, the second water inlet hole and the first water outlet hole. Before the valve rod is operated, the mixing hole of the operating valve piece is positioned at a position misaligned with the first water inlet hole and the second water inlet hole of the fixing valve piece such that both of cold water and hot water are configured to be blocked by the operating valve piece and the faucet is closed. The check valve has two symmetric housing members which are configured to fit together to secure a fixing tube, a movable valve core and two springs therein. Each of the housing members further has a passage, a water inlet end and a water outlet end, which are communicated with each other. The two passages are configured to communicate with each other to form an accommodating space for the fixing tube, the valve core and the two springs. The check valve is configured to be positioned inside the water inlet chamber of the valve base, and the two water outlet ends of the two housing members are respectively aligned and communicated with the cold water inlet hole and the hot water inlet hole. The fixing tube has at least a sealing ring disposed on an outer periphery thereof, and two first openings formed at the outer periphery of the fixing tube are respectively located close to two ends of the fixing tube. Two axial compartments respectively formed at two ends of the valve core are separated by a partition, and each of the compartments has a second opening formed at an outer periphery thereof. When cold water and hot water flow into the check valve, the valve core is configured to have movement relative to the fixing tube to change a relative position between the first opening and the second opening such that the check valve is configured to balance the water pressure difference generated from the cold water and hot water. Additionally, the two springs are respectively positioned inside the two compartments of the valve core, and each of the springs has two ends respectively abutting against the housing member and the partition. As a result, the valve core abutted by the springs is configured to keep at a central position of the accommodating space before water flows into the check valve.

Comparing with conventional water control valve, the present invention is advantageous because: (i) the water control valve is configured to enable water to flow out through the bottom portion or the lateral portion of the valve shell thereby fitting to different kinds of faucets; (ii) when cold water and hot water concurrently flow into the water control valve, the check valve is configured to balance the water pressure difference inside the water control valve, thereby provide stable temperature of water; (iii) the two springs are configured to abut against the two ends of the valve core respectively, which prevents the phenomenon of water hammer, the resonance noise in the water channels, and the severe movement of the valve core when the water control valve having sudden pressure difference formed therein.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 4, 8 and 9, the present invention provides a water control valve which comprises a valve shell (10), a sliding block (20), an operating valve piece (30), a fixing valve piece (40), a valve base (50) and a check valve (60). The sliding block (20) configured to position inside the valve shell (10) has a valve rod (21) which is formed at an upper portion thereof and sticking out of the valve shell (10). Moreover, a bottom portion of the sliding block (20) is engaged with the operating valve piece (30) such that, through operating the valve rod (21), the sliding block (20) is configured to drive the operating valve piece (30) to have movements concurrently thereby achieving different aligning patterns between the operating valve piece (30) and the fixing valve piece (40). Thus, the water control valve is configured to control on/off operation of a faucet, the amount of water flow and the mixing ratio of hot/cold water. The valve base (50) is configured to block a bottom portion of the valve shell (10), thereby preventing the sliding block (20), the operating valve piece (30) and the fixing valve piece (40) from falling out of the valve shell (10). Also, the valve base (50) comprises a water inlet chamber (51), and the check valve (60) is installed therein. The valve shell (10) comprises a housing chamber (11) formed therein, and an upper portion of the valve shell (10) has a diameter smaller than a lower portion thereof, and an upper opening (12) is formed at the upper end of the valve shell (10). The sliding block (20), the operating valve piece (30) and the fixing valve piece (40) are configured to be positioned inside the housing chamber (11) of the valve shell (10) in sequence, and the valve rod (21) is configured to stick out of the valve shell (10) through the upper opening (12). Moreover, the housing chamber (11) comprises at least a water outlet opening (13) penetrating through a lateral wall of the valve shell (10). The operating valve piece (30) has a mixing hole (31) vertically penetrating through a central portion thereof, and a top surface of the operating valve piece (30) has at least a horizontal water channel (32) which is communicated with the mixing hole (31). The fixing valve piece (40) has a first water inlet hole (41) and a second water inlet hole (42), which are formed at corresponding positions and respectively penetrate through a bottom portion of the fixing valve piece (40). Furthermore, a first water outlet hole (43) vertically penetrating through the fixing valve piece (40) is located between the first water inlet hole (41) and the second water inlet hole (42). The valve base (50) comprises the water inlet chamber (51) and a water outlet chamber (54), which are separately formed at an interior space of the valve base (50). Moreover, a cold water inlet hole (52) and a hot water inlet hole (53) respectively penetrate through a top portion of the valve base (50) to communicate with the water inlet chamber (51), and a second water outlet hole (55) penetrates through the top portion of the valve base (50) to communicate with the water outlet chamber (54). The operating valve piece (30) and the fixing valve piece (40) are overlapped and positioned inside the housing chamber (11), and the valve base (50) is configured to support and engage with the fixing valve piece (40). Also, the cold water inlet hole (52), the hot water inlet hole (53) and the second water outlet hole (55) are configured to be respectively aligned with the first water inlet hole (41), the second water inlet hole (42) and the first water outlet hole (43). Before the valve rod (21) is operated, the mixing hole (31) of the operating valve piece (30) is positioned at a position misaligned with the first water inlet hole (41) and the second water inlet hole (42) of the fixing valve piece (40) such that both of cold water and hot water are configured to be blocked by the operating valve piece (30) and the faucet is closed. The check valve (60) has two symmetric housing members (61) which are configured to fit together to secure a fixing tube (62), a movable valve core (63) and two springs (64) therein. Each of the housing members (61) further has a passage (611), a water inlet end (612) and a water outlet end (613), which are communicated with each other. The two passages (611) are configured to communicate with each other to form an accommodating space for the fixing tube (62), the valve core (63) and the two springs (64). The check valve (60) is configured to be positioned inside the water inlet chamber (51) of the valve base (50), and the two water outlet ends (613) of the two housing members (61) are respectively aligned and communicated with the cold water inlet hole (52) and the hot water inlet hole (53). The fixing tube (62) has at least a sealing ring disposed on an outer periphery thereof, and two first openings (621) formed at the outer periphery of the fixing tube (62) are respectively located close to two ends of the fixing tube (62). Two axial compartments (631) respectively formed at two ends of the valve core (63) are separated by a partition (623), and each of the compartments (631) has a second opening (633) formed at an outer periphery thereof. When cold water and hot water flow into the check valve (60), the valve core (63) is configured to have movement relative to the fixing tube (62) to change a relative position between the first opening (621) and the second opening (633) such that the check valve (60) is configured to balance the water pressure difference generated from the cold water and hot water. Additionally, the two springs (64) are respectively positioned inside the two compartments (631) of the valve core (63), and each of the springs (64) has two ends respectively abutting against the housing member (61) and the partition (632). As a result, the valve core (63) abutted by the springs (64) is configured to keep at a central position of the accommodating space before water flows into the check valve (60).

In one embodiment, the valve base (50) is engaged with the bottom portion of the valve shell (10) to provide support for the fixing valve piece (40), the operating valve piece (30) and the sliding block (20), which are positioned inside the housing chamber (11) of the valve shell (10).

Figure 1:
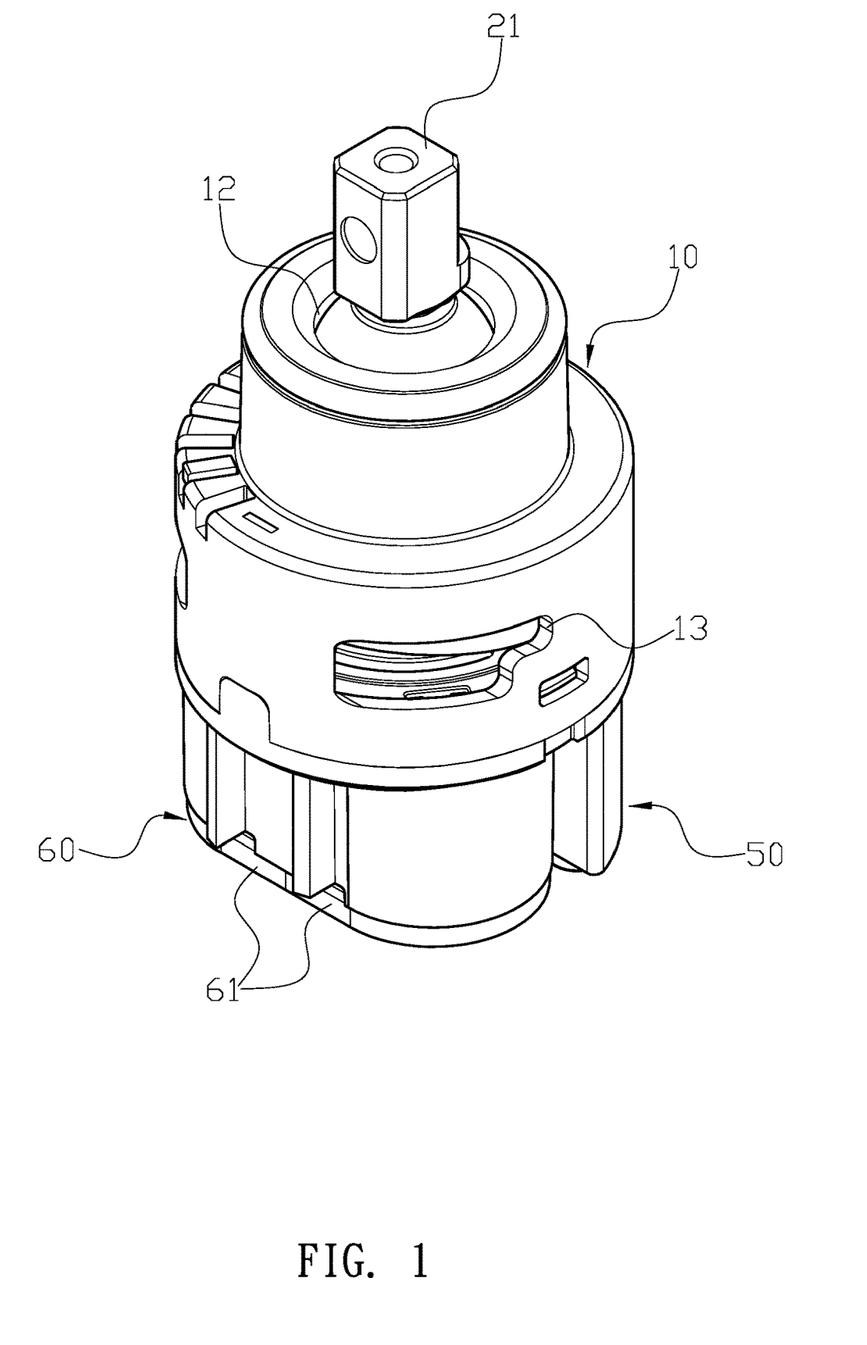
FIG. 1 is a three-dimensional assembly view of a water control valve of the present invention.
Figure 2:
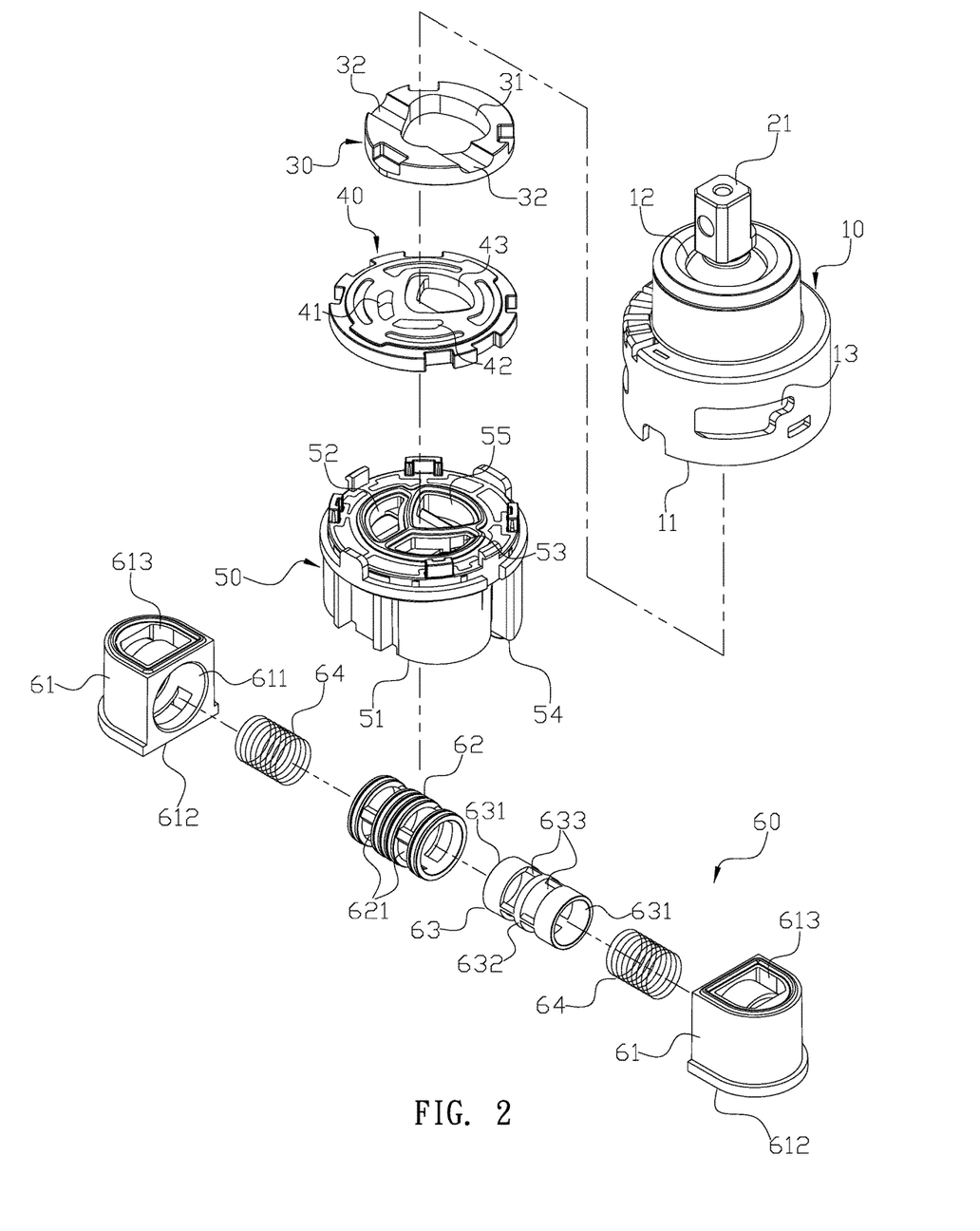
FIG. 2 is a three-dimensional exploded view of the water control valve of the present invention.
Figure 3:
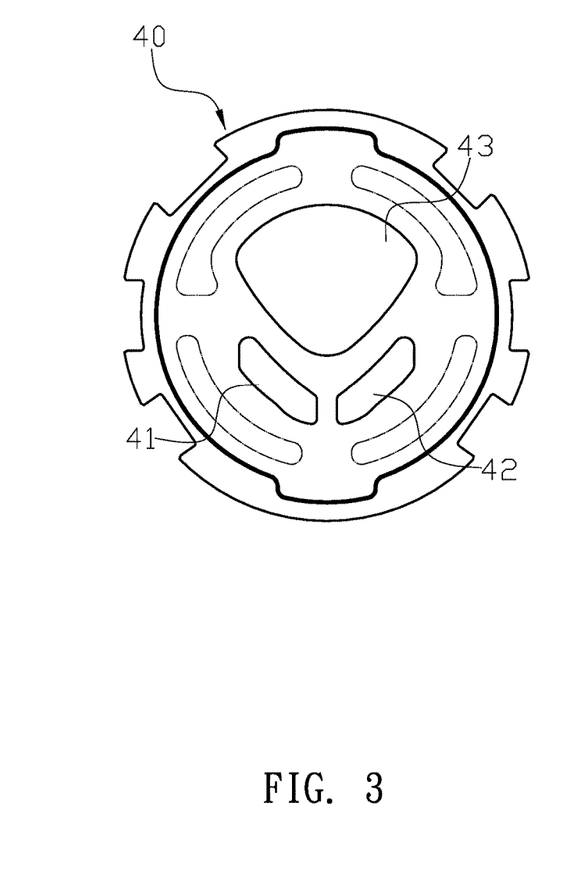
FIG. 3 is a plan view of a fixing valve piece of the water control valve in the present invention.
Figure 4:
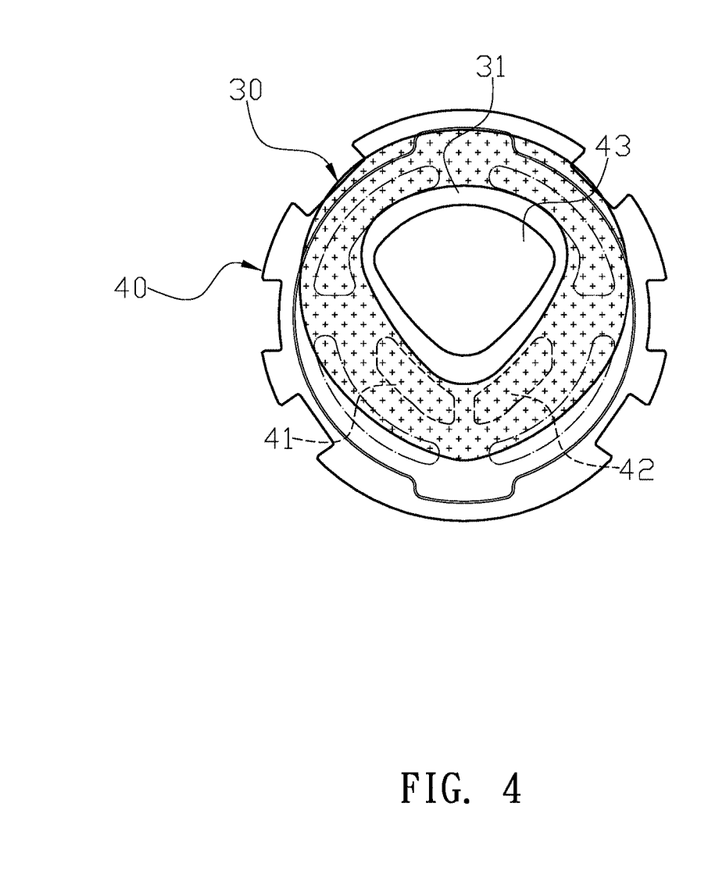
FIG. 4 is a schematic view of a relative position between an operating valve piece and the fixing valve piece of the water control valve of the present invention when a faucet is closed.
Figure 5:
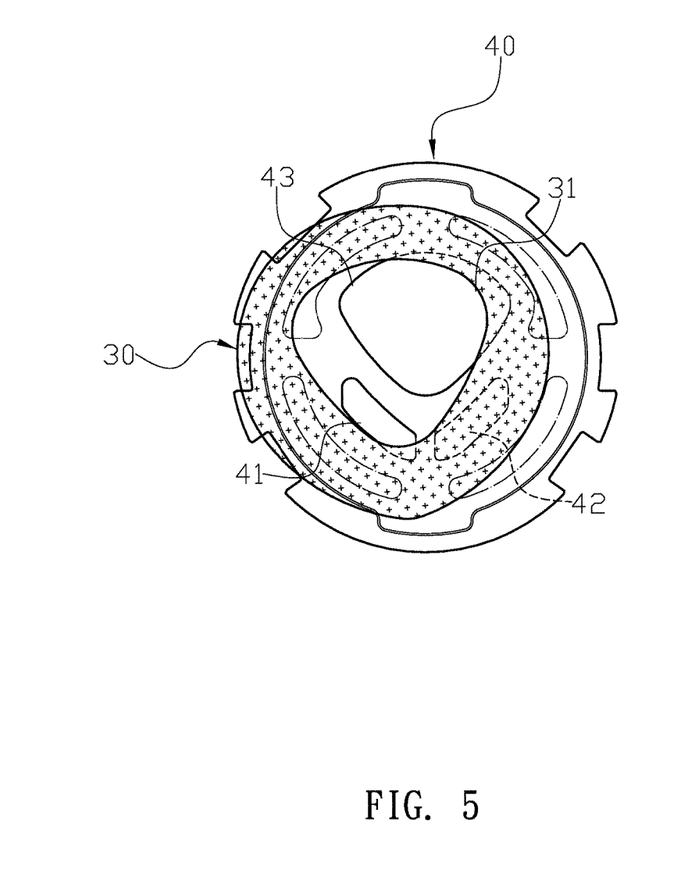
FIG. 5 is a schematic view of a relative position between the operating valve piece and the fixing valve piece of the water control valve of the present invention when the faucet provides cold water.
Figure 6:
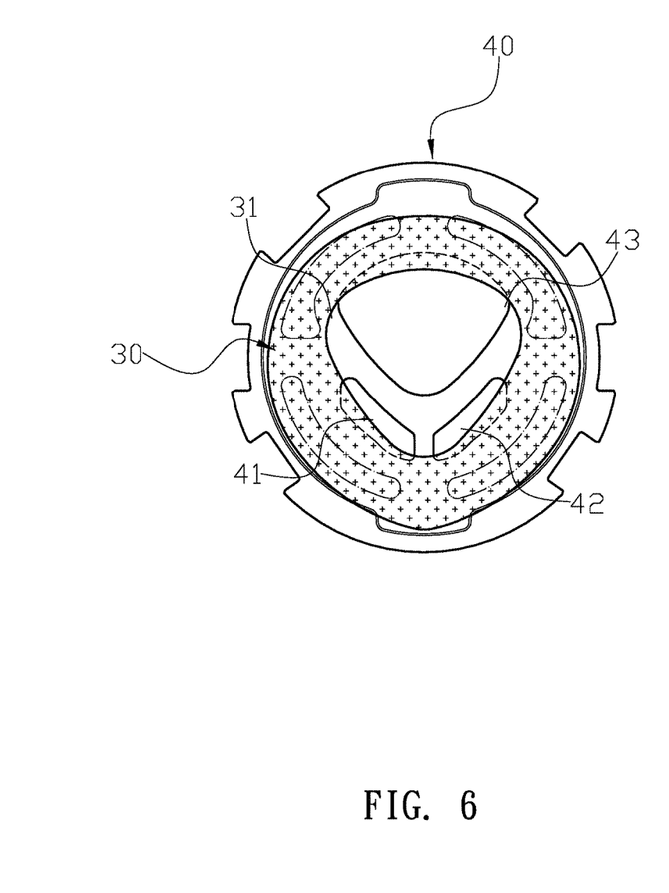
FIG. 6 is a schematic view of a relative position between the operating valve piece and the fixing valve piece of the water control valve of the present invention when the faucet provides warm water.
Figure 7:
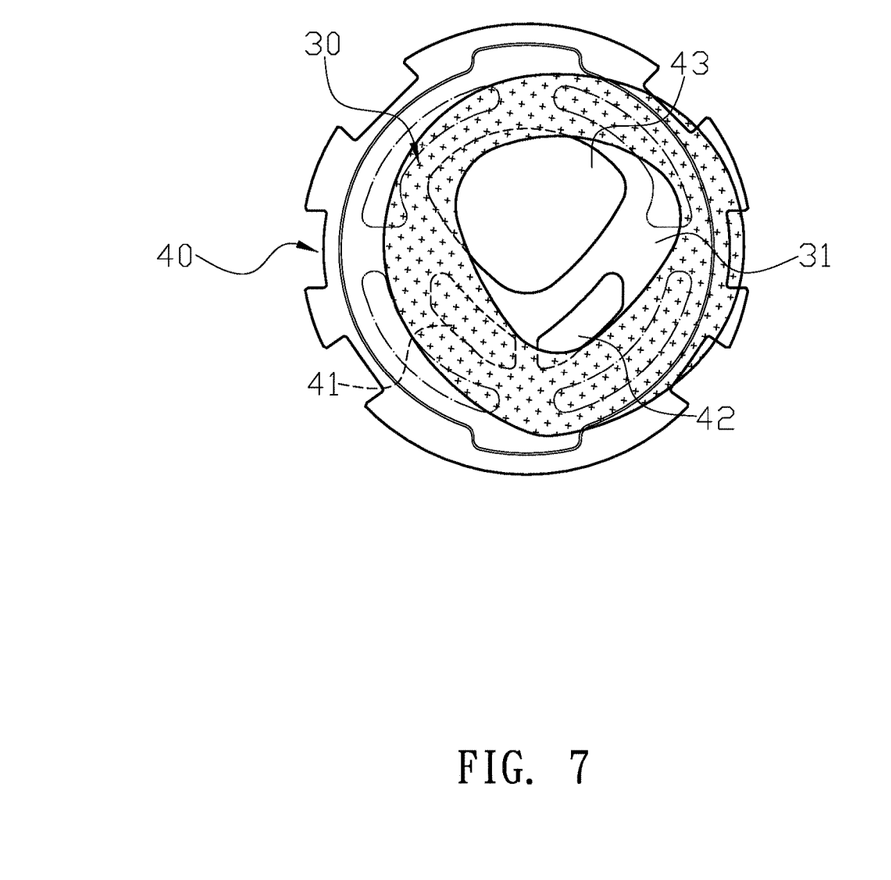
FIG. 7 is a schematic view of a relative position between the operating valve piece and the fixing valve piece of the water control valve of the present invention when the faucet provides hot water.
Figure 8:
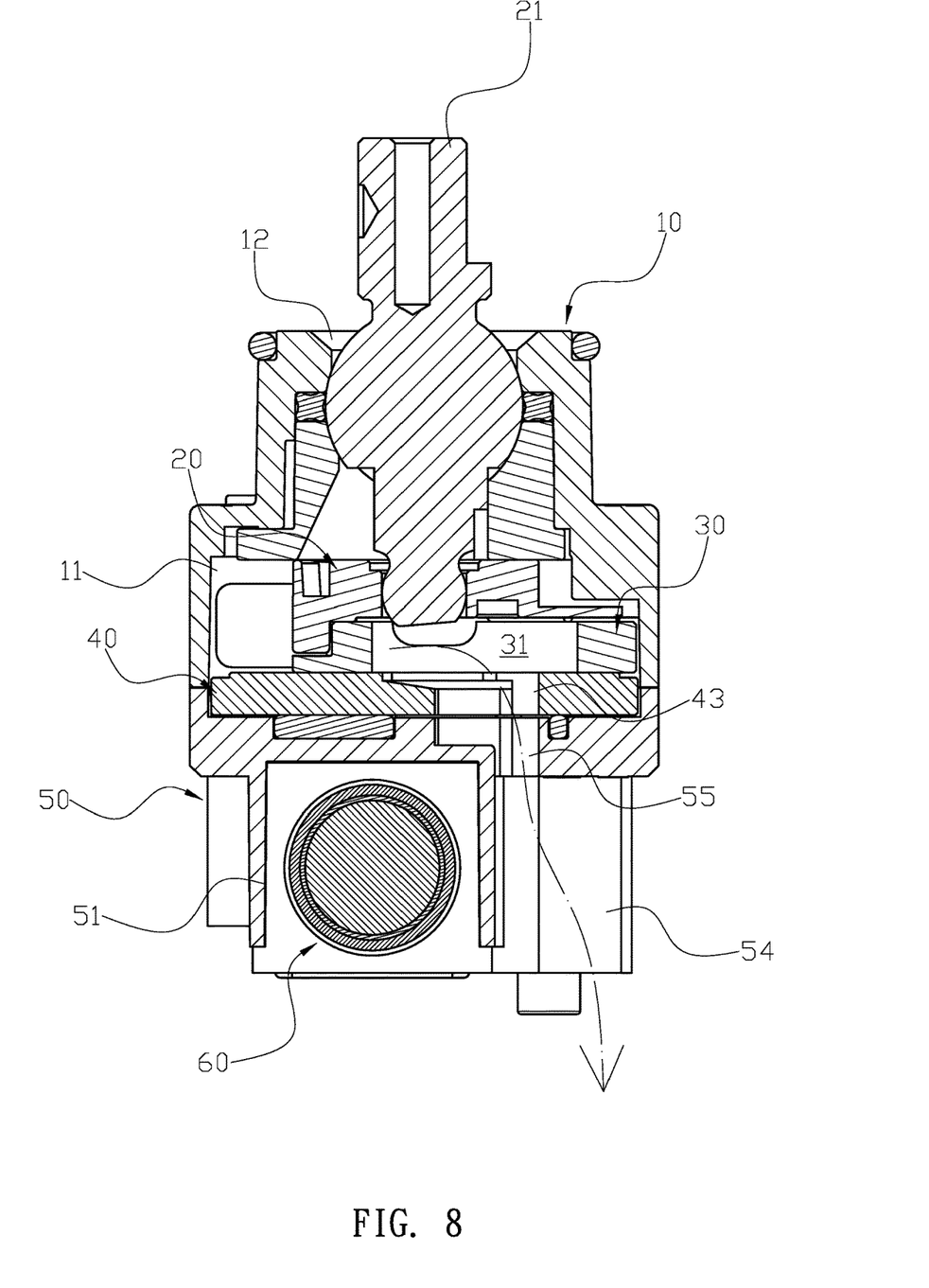
FIG. 8 is a schematic view illustrating water is provided through a bottom portion of the water control valve of the present invention.
Figure 9:
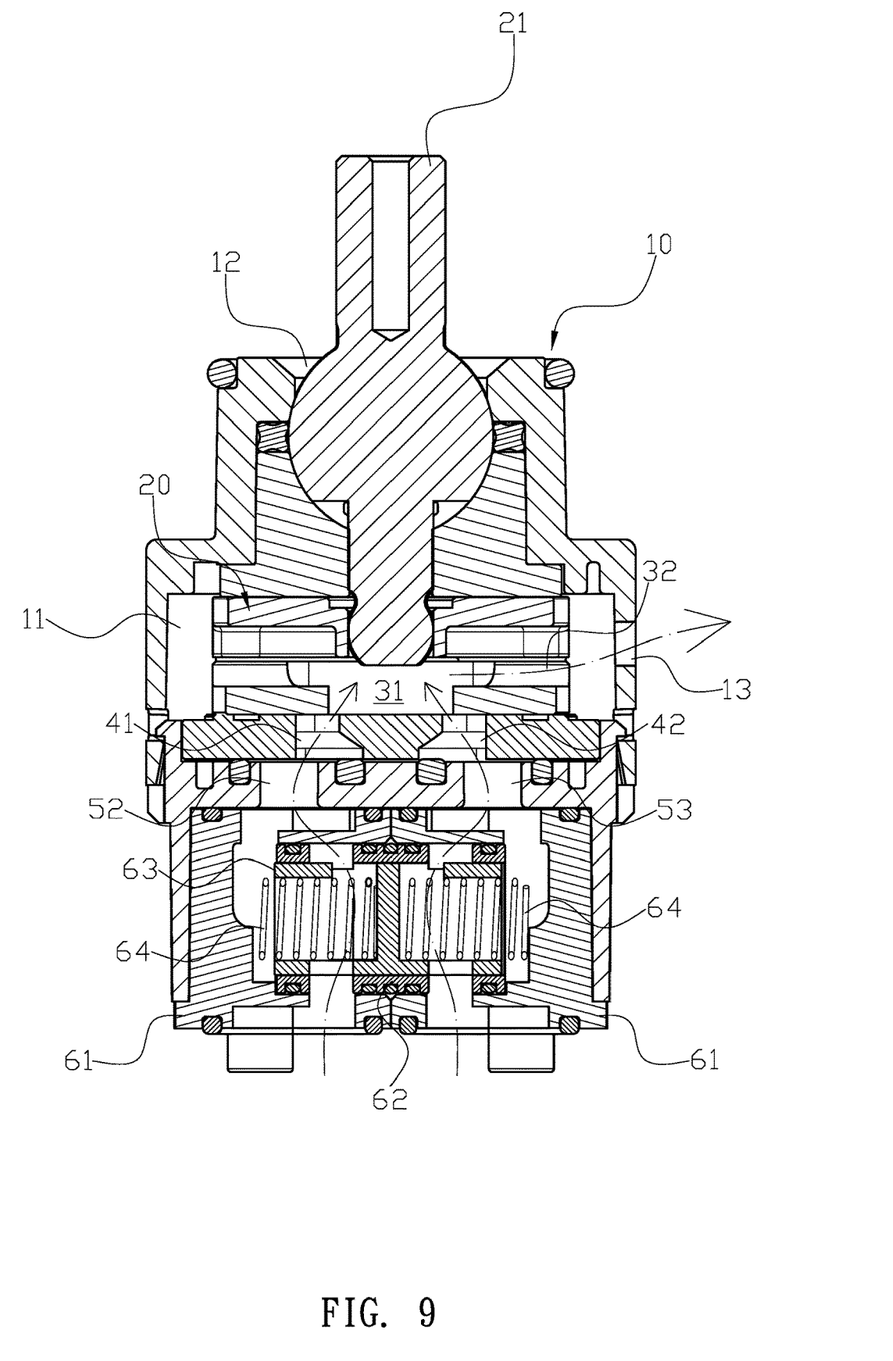
FIG. 9 is a schematic view illustrating water is provided through a lateral portion of the water control valve of the present invention.

In actual application, cold water and hot water are configured to flow through the two water inlet ends (612) respectively into the check valve (60). After balancing the water pressure difference through the fixing tube (62) and the valve core (63), the cold water and the hot water are configured to respectively flow through the two water outlet ends (613), the cold water inlet hole (52) of the valve base (50) and the hot water inlet hole (53) of the valve base (50), and flow into the housing chamber (11) of the valve shell (10). A user can turn the valve rod (21) in a direction to have cold water, and the sliding block (20) is configured to drive the operating valve piece (30) to align the mixing hole (31) with the first water inlet hole (41) and the first water outlet hole (43) concurrently. Thus, the cold water is configured to flow out of the faucet (as shown in FIG. 5). Conversely, a user can turn the valve rod (21) in the other direction to have warm water or hot water, and the temperature of water is controlled by the turning angle of the valve rod (21). When the valve rod (21) is gradually turned into the other direction, the mixing hole (31) is configured to be aligned with the first water inlet hole (41) and the second water inlet hole (42) concurrently such that the cold water and the hot water are configured to be mixed into the warm water flowing out of the faucet (as shown in FIG. 6). In addition, a user can keep turning the valve rod (21) to enable the mixing hole (31) to only align with the second water inlet hole (42), and only hot water is configured to flow out of the faucet (as shown in FIG. 7). Furthermore, the water control valve of the present invention is configured to be applied to different kinds of faucets. In other word, water is not only configured to flow through the first water outlet hole (43), the water outlet chamber (54) and the second water outlet hole (55) of the valve base (50) and flow out of the water control valve from a bottom portion thereof (as shown in FIG. 8), but also configured to flow through the mixing hole (31), the water channel (32) and the water outlet opening (13) of the valve shell (10) and flow out of the water control valve from a lateral side thereof (as shown in FIG. 9).

Comparing with conventional water control valve, the present invention is advantageous because: (i) the water control valve is configured to enable water to flow out through the bottom portion or the lateral portion of the valve shell (10) thereby fitting to different kinds of faucets; (ii) when cold water and hot water concurrently flow into the water control valve, the check valve (60) is configured to balance the water pressure difference inside the water control valve, thereby provide stable temperature of water; (iii) the two springs (64) are configured to abut against the two ends of the valve core (63) respectively, which prevents the phenomenon of water hammer, the resonance noise in the water channels, and the severe movement of the valve core (63) when the water control valve having sudden pressure difference formed therein.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A water flow control valve comprising a valve shell, a sliding block, an movable valve piece, a fixed valve piece, a valve base and a check valve;
   wherein the sliding block, the movable valve piece and the fixed valve piece are stacked from top to bottom and are positioned inside the valve shell; the sliding block has a valve rod which is formed at an upper portion thereof and sticking out of the valve shell, and a bottom portion of the sliding block is engaged with the movable valve piece such that, through operating the valve rod, the sliding block is configured to drive and have movements with the movable valve piece concurrently to perform different aligning patterns between the movable valve piece and the fixed valve piece, thereby enabling the water control valve to control on/off operation of a faucet, the amount of water flow and the mixing ratio of hot/cold water; the valve base is configured to block a bottom portion of the valve shell, thereby preventing the sliding block, the movable valve piece and the fixed valve piece from falling out of the valve shell; the valve base comprises a water inlet chamber, and the check valve is installed therein;
   wherein the valve shell comprises a housing chamber formed therein, and an upper opening is formed at the upper end of the valve shell; the sliding block, the movable valve piece and the fixed valve piece are configured to be positioned inside the housing chamber of the valve shell in sequence, and the valve rod is configured to stick out of the valve shell through the upper opening; the housing chamber comprises at least a water outlet opening penetrating through a lateral wall of the valve shell;

wherein the movable valve piece has a mixing hole vertically penetrating through a central portion thereof, and a top surface of the movable valve piece has at least a horizontal water channel which is communicated with the mixing hole;

wherein the fixed valve piece has a first water inlet hole and a second water inlet hole, which are formed at corresponding positions and respectively penetrate through a bottom portion of the fixed valve piece; a first water outlet hole vertically penetrating through the fixed valve piece is located between the first water inlet hole and the second water inlet hole;

wherein the valve base comprises the water inlet chamber and a water outlet chamber, which are separately formed at an interior space of the valve base; a cold water inlet hole and a hot water inlet hole respectively penetrate through a top portion of the valve base to communicate with the water inlet chamber, and a second water outlet hole penetrates through the top portion of the valve base to communicate with the water outlet chamber; the movable valve piece and the fixed valve piece are overlapped and positioned inside the housing chamber, and the valve base is configured to support and engage with the fixed valve piece; the cold water inlet hole, the hot water inlet hole and the second water outlet hole are configured to be respectively aligned with the first water inlet hole, the second water inlet hole and the first water outlet hole; before the valve rod is operated, the mixing hole of the movable valve piece is positioned at a position misaligned with the first water inlet hole and the second water inlet hole of the fixed valve piece such that both of cold water and hot water are configured to be blocked by the movable valve piece and the faucet is closed; and wherein the check valve has two symmetric housing members which are configured to fit together to secure a fixed tube, a movable valve core and two springs therein; each of the housing members has a passage, a water inlet end and a water outlet end, which are communicated with each other; the two passages are configured to communicate with each other to form an accommodating space for the fixed tube, the valve core and the two springs; the check valve is configured to be positioned inside the water inlet chamber of the valve base, and the two water outlet ends of the two housing members are respectively aligned and communicated with the cold water inlet hole and the hot water inlet hole; the fixed tube has at least a sealing ring disposed on an outer periphery thereof, and two first openings formed at the outer periphery of the fixed tube are respectively located close to two ends of the fixed tube; two axial compartments respectively formed at two ends of the valve core are separated by a partition, and each of the compartments has a second opening formed at an outer periphery thereof; when cold water and hot water flow into the check valve, the valve core is configured to have movement relative to the fixed tube to change a relative position between the first opening and the second opening such that the check valve is configured to balance the water pressure difference generated from the cold water and hot water; the two springs are respectively positioned inside the two compartments of the valve core, and each spring has a first end and a second end respectively; said first end abutting against a sidewall of the housing member and said second end abutting against the partition; and the valve core abutted by the springs is configured to keep at a central position of the accommodating space before water flows into the check valve.

2. The water flow control valve of claim 1, wherein an upper portion of the valve shell has a diameter smaller than a lower portion thereof.

3. The water flow control valve of claim 1, wherein the valve base is engaged with the bottom portion of the valve shell to provide support for the fixed valve piece, the movable valve piece and the sliding block, which are positioned inside the housing chamber of the valve shell.

* * * * *